Sept. 9, 1924.                                                          1,508,081
T. H. BEAN
FAN BELT TIGHTENER
Filed Nov. 17, 1923

Inventor
Tat H Bean,
By Chas J Williamson
Attorney

Patented Sept. 9, 1924.

1,508,081

UNITED STATES PATENT OFFICE.

TAT H. BEAN, OF AMARILLO, TEXAS.

FAN-BELT TIGHTENER.

Application filed November 17, 1923. Serial No. 675,303.

*To all whom it may concern:*

Be it known that I, TAT H. BEAN, residing at Amarillo, Texas, a citizen of the United States, have invented certain new and useful Improvements in Fan-Belt Tighteners, of which the following is a specification.

The object of my invention is to provide an automatically acting belt adjuster or tightener for the fan driving belts of Ford cars and in achieving my object I have done so by a device that consists of a single spring member which can be applied to the car without any alteration or modification whatever; can be very easily and cheaply manufactured and easily installed; will serve as a safety device to prevent damage to the fan or to the hood of the car should the belt break; will prevent the belt slipping on the one hand or being overstrained on the other; and by adding to the efficiency of the fan will keep the engine cooler and economize in oil and gasoline. My invention consists in whatever is described by or is included within the terms or scope of the appended claims.

In the accompanying drawings:—

Figure 1:
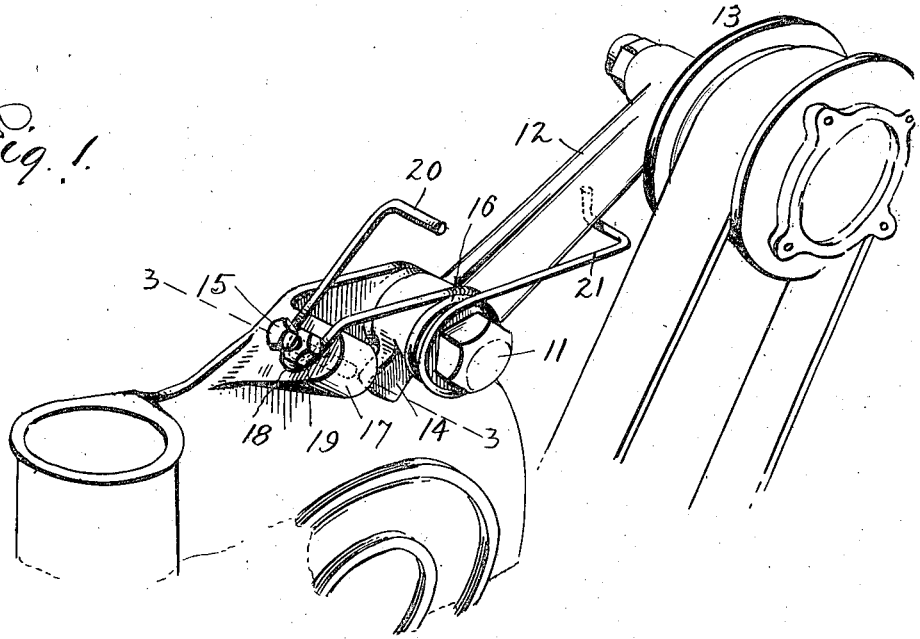
Fig. 1 is a perspective view of enough of the engine of a Ford to illustrate my invention.
Figure 2:
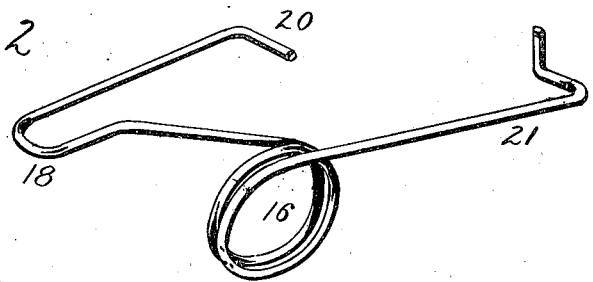
Fig. 2 is a detail view in perspective of the tension device.
Figure 3:
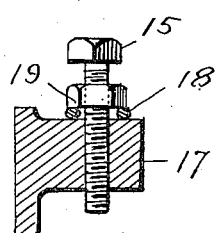
Fig. 3 is a detail view in section on line 3—3 of Fig. 1.

Referring in detail to what is shown in the drawings, 10 designates the front, crank case cover of a Ford car to a bolt, 11, on which is pivoted the arm, 12, which supports the fan belt pulley, 13, which arm has a lug, 14, that is adapted to be engaged by a bolt or a screw, 15, passing through a threaded hole in the lug, 17, on the crank case cover to adjust the tension of the belt by moving said arm, the construction in all these regards being the typical or characteristic Ford construction and none of which need to be altered or modified in any respect for the application of my invention and some of which I make use of in applying my device. My invention comprises a coil, 16, of one or more turns of heavy spring wire which fits over the hub and wheel of the arm pivoting bolt and which coil has one terminal that extends tangentially from the outer side of the coil to provide an arm, 21, which extends alongside the pulley supporting arm, 12, and hooks thereunder so that it tends by the action of the coil to swing said arm in the direction to tighten the belt which obviously is done by a gentle, yielding force, while its other terminal extends in the opposite direction and is bent into a half turn or loop, 18, to straddle the usual tension adjusting bolt or screw, 15, above mentioned and to lie between the lug, 17, and the lock-nut, 19, on said bolt or screw and thereby provide the reaction against which the spring works. One arm of the loop is extended towards the swinging arm 12 and has a lateral extension 20, that extends crosswise of said arm at such a point that should the fan belt break and the arm swing upward it will engage such extension and be arrested thereby and thus damage to either fan or hood will be prevented. The stop thus provided is more or less resilient and thus the force of the blow of the arm will be cushioned.

What I claim is:

1. The combination with the swinging fan pulley arm of a Ford engine and the arm adjusting screw thereof of a spring secured in place by said screw and having means to engage said arm, the spring having a stop member to limit the movement of said arm in the direction which the spring tends to move it.

2. A fan belt adjuster for Fords comprising a spring having a coil adapted to be placed concentric with the spring arm of the belt adjuster and oppositely extending terminals one for engagement with said arm and the other having a loop for clamping engagement of the usual arm adjusting device, said loop being extended to place its free end in position for engagement by said arm.

In testimony whereof I hereunto affix my signature.

TAT H. BEAN.